United States Patent [19]

Way, Jr.

[11] 4,077,391

[45] Mar. 7, 1978

[54] PORTABLE SOLAR COOKER AND THE SOLAR PANEL USED THEREIN

[76] Inventor: Lee V. Way, Jr., Rte. 3, Box 333C, Wilmington, N.C.

[21] Appl. No.: 752,622

[22] Filed: Dec. 20, 1976

[51] Int. Cl.² ............................................. F24J 3/02
[52] U.S. Cl. ............................... 126/270; 126/271
[58] Field of Search ................. 126/270, 271, 400

[56] References Cited

U.S. PATENT DOCUMENTS

| | | | |
|---|---|---|---|
| 2,705,948 | 4/1955 | Roster | 126/271 |
| 3,106,201 | 10/1963 | Steinberg | 126/270 |
| 3,236,227 | 2/1966 | Steinberg | 126/270 |
| 3,239,000 | 3/1966 | Meagher | 126/271 |
| 3,938,497 | 2/1976 | Andrassy | 126/270 |
| 3,985,116 | 10/1976 | Kapany | 126/270 |
| 4,029,077 | 6/1977 | Gorniak | 126/271 |

*Primary Examiner*—John J. Camby
*Assistant Examiner*—Henry C. Yuen
*Attorney, Agent, or Firm*—B. B. Olive

[57] ABSTRACT

A portable solar cooker comprises an internally insulated metal housing having an oven compartment for slidably receiving a cooking tray. A plurality of adjustable sun reflectors arranged on the top of the housing direct the sun's radiation into a heat-generating area. The heat-generating area is insulated by the air space formed by two transparent windows. Beneath the inner window and directly above the oven roof are a plurality of heat generating strips formed from fibrous insulation material covered by thin sheets of black foil. A series of spacers maintain spacing between the strips. The solar panels comprising the windows, heat generators and an appropriate heated chamber form a part of the invention.

8 Claims, 5 Drawing Figures

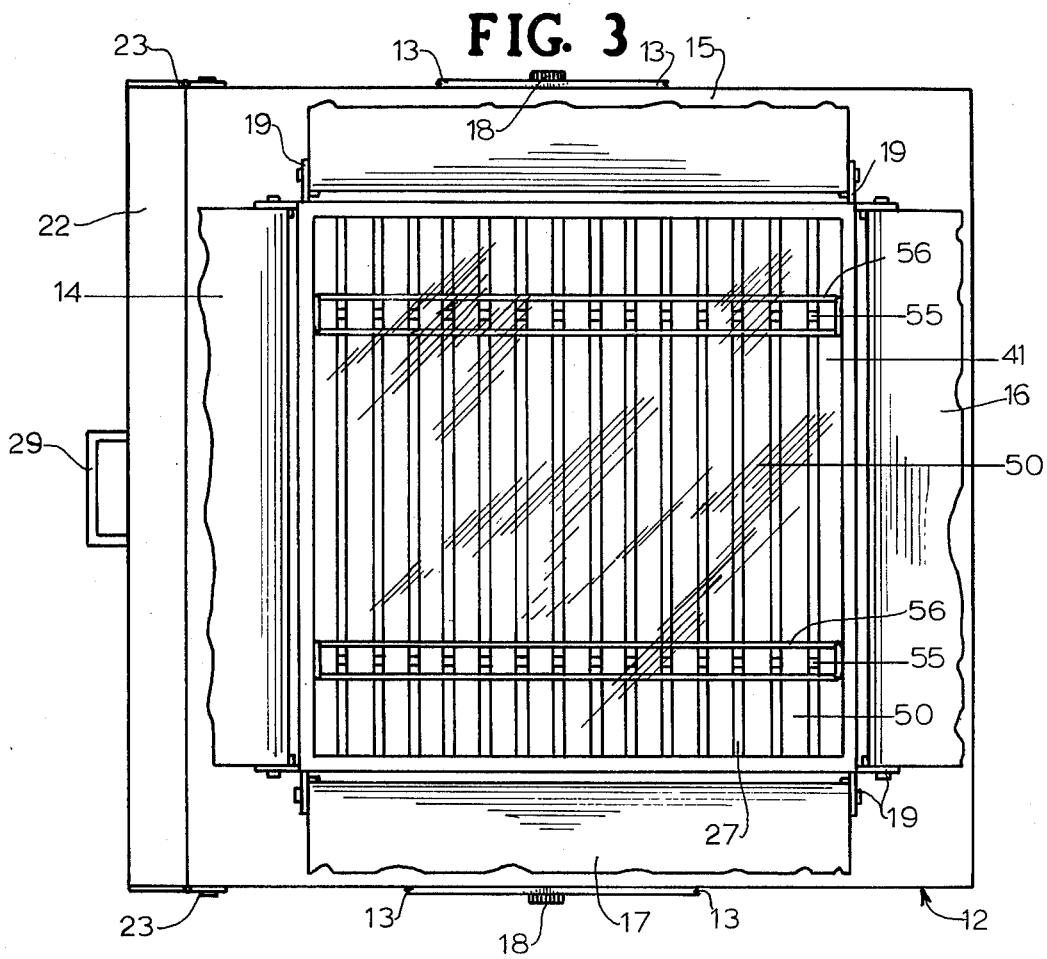
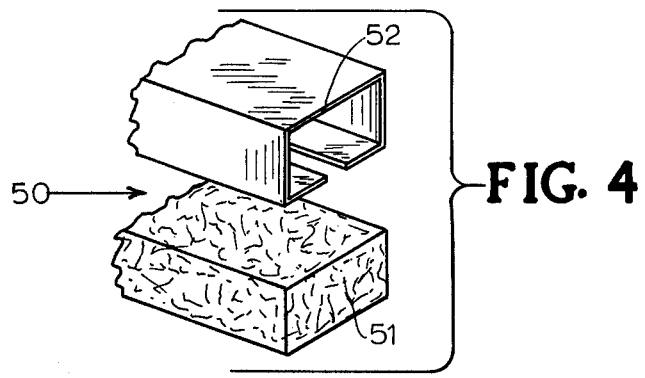
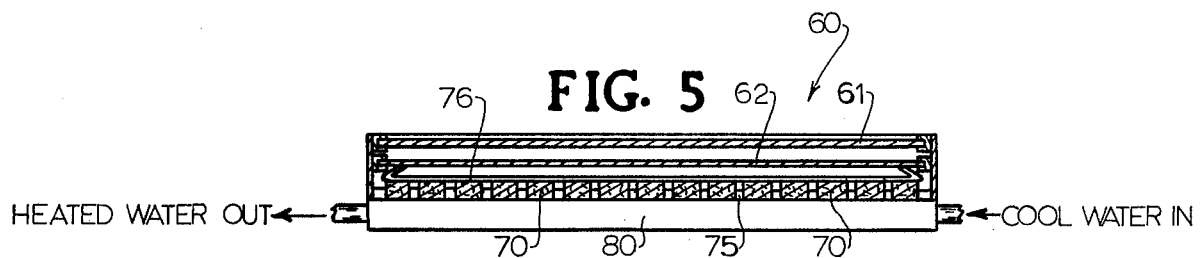

PORTABLE SOLAR COOKER AND THE SOLAR PANEL USED THEREIN

BACKGROUND OF THE INVENTION

1. Field of the Invention

This invention relates to portable cookers and particularly to portable cookers which utilize solar energy as the source of energy for cooking.

2. Description of the Prior Art

The advent of the energy shortage has increased the importance of non-fossil energy sources such as solar radiation for cooking. The basic problem with available solar cookers is that an adequate transfer of heat energy from the heat generating panel into the oven has not been achieved.

Solar cooker constructions similar to that of the present invention are illustrated in a series of patents issued to Hyman A. Steinberg, e.g., U.S. Pat. No. 3,106,201. The device described in this patent has a housing construction with solar energy reflectors and means for transferring the solar energy to an oven area. The radiant energy is directed to a flat metal collector plate which generates heat; however, no means is shown for efficiently transferring the heat so generated into the underlying oven.

Thus, it becomes an object of the present invention to provide a solar cooker having a heat generating and transfer unit capable of efficiently transferring heat to the oven.

SUMMARY OF THE INVENTION

The portable solar cooker of the present invention utilizes a metal housing which is lined with insulation and which defines an oven compartment. A plurality of adjustable sun reflectors are pivotally mounted on the top of the housing and direct the sun's energy onto a top surface formed from two spaced-apart transparent windows. An energy transfer surface is formed beneath the inner window and consists of strips of fibrous insulation individually wrapped with sheets of black metal foil. These strips of wrapped insulation are spaced apart by spacers and cover the roof of the oven chamber. Flexible wire retainers hold the wrapped insulation strips in place on top of the oven chamber. In operation, solar energy is reflected from the reflectors through the windows and onto the heat generating strips. A substantial portion of the heat generated in this area passes through the spaces between the strips and is transferred through the oven roof and into the oven.

DESCRIPTION OF THE DRAWINGS

FIG. 3 is a plan view of the device of FIG. 1.

FIG. 4 is an enlarged, fragmentary, exploded perspective view of one of the heat generating strip members formed from fibrous insulation and a black coated foil wrapper.

FIG. 5 is a side section view of a solar panel constructed according to the present invention and utilized for heating water.

DESCRIPTION OF THE PREFERRED EMBODIMENT

Figure 1:
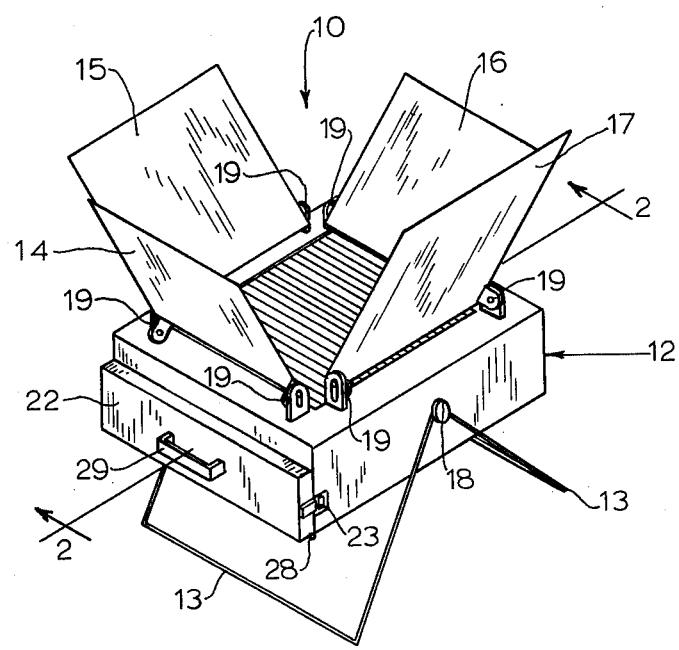
FIG. 1 is a pictorial view illustrating a solar cooker construction in accordance with the present invention.

With continued reference to the drawings, there is illustrated a solar cooker 10 comprising a generally box-like housing 12, a support stand 13, and four pivotally-mounted solar reflectors 14, 15, 16 and 17. Stand 13 is secured to a pair of pivotal mounts 18 to allow the cooker 10 to be tilted to a position substantially normal to the incident solar rays. Reflectors 14–17 are hingedly connected as at 19 to allow them to be fanned outwardly as shown in FIG. 1 for increasing the solar energy directed to the heat generating area. The reflectors may be folded flat against the housing 12 for storage and carrying purposes.

Figure 2:
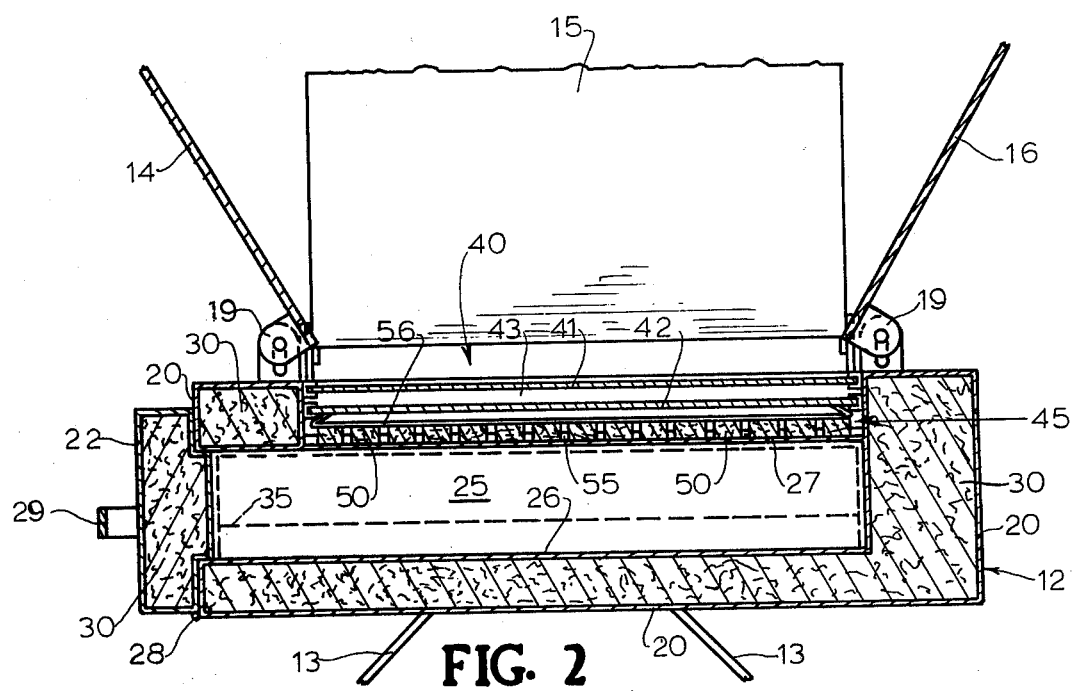
FIG. 2 is an enlarged section view taken substantially along line 2—2 of FIG. 1 with the cooking tray shown in dashed lines.

Housing 12 is formed by outer walls 20 made from sheet metal or other suitable materials. Housing 12 encloses an oven compartment 25 which is defined by a bottom 26, a roof 27, and three sidewalls. The fourth side of oven 25 (shown to the left in FIG. 2) is closed by a door 22 which has an inwardly-directed boss formation that fits slightly into oven 25 to form a substantially air-tight seal. A cooking tray 35 (shown in dashed lines in FIG. 2) slidably fits into oven 25 and is removable through door 22. Door 22 pivots about a hinge 28 and has a handle 29 for opening and closing operations. As shown in FIG. 2, the spacings between the outer walls 20 and oven 25 are filled with a suitable insulating material 30 as is the inside of door 22. A pair of latches 23 secures door 22 when closed.

The description will now turn to a detailed discussion of the elements giving the cooker 10 its unique heat generating and heat transferring capabilities. Breifly stated, solar rays are directed onto a solar panel 40 located above oven compartment 25. The solar energy generates heat within the panel and the heat so generated is efficiently transferred through oven roof 27 and into oven 25. For this reason, oven roof 27 is made from a relatively thin, highly heat conductive material.

Panel 40 is defined as extending from a first outer transparent window 41 downward to oven roof 27. Window 41 is spaced approximately ½ inch from and parallel to a second inner transparent window 42. The air space 43 formed between windows 41, 42 serves as insulation to prevent significant amounts of heat from escaping the heat generating area within panel 40. Window 42 is spaced approximately 1 to 1½ inches from the oven roof 27 forms a heat generating space 45. As best shown in FIG. 3, heat generating space 45 encloses a plurality of spaced-apart strip members 50 which run the length of windows 41, 42. Strip members 50 serve to absorb the solar energy directed onto panel 40 and, because of the unique construction of these strips and their relative spacings, serve to efficiently transfer the generated heat into oven 25. Each strip member 50 includes a tubular body portion 51 covered by a sheet material 52. In the preferred embodiment, body portion 51 is made from a fibrous insulation material of the type used in conventional home attic insulation. The sheet material 52 is preferably a thin metal foil (e.g. aluminum foil) folded to fit around the body portion 51 and having an outer surface that is flat black to enhance solar energy absorption. Strip members 50 are held in an evenly spaced arrangement by a series of small spacer bars 55 (FIG. 3).

It has been found that the optimum heat generating and heat transfer characteristics are obtained when the strip members 50 rest directly upon oven roof 27 with the upper surfaces of the members 50 spaced approximately ¼ inch from second window 42. In order to hold the strip members 50 in this position spaced from window 42, a pair of spring steel spacer members 56 are compressed in place between window 42 and members 50 to exert a downward force on the members 50. Because the strip members 50 are securely held in place by spacer members 55 and 56, members 50 will not shift during the transportation of cooker 10. In an alternative form of the invention not illustrated, the second window 42 may bear directly upon the surface of strip members 50 to hold them in place.

In operation, cooker 10 is placed in the sunlight with the upper surface of panel 40 situated substantially normal to the direction of the sun's rays. The food to be cooked may be placed in the cooker as it begins to generate heat; or, in the alternative, the operator may decide to wait until the oven preheats to a predetermined cooking temperature. In this regard, cooker 10 may be provided with an opening (not shown) allowing an oven thermometer to be inserted into the oven compartment 25 to measure the oven temperature. As the temperature builds up, the solar energy passes through windows 41, 42 and is absorbed by the upper flat black surfaces of strip members 50. The heat so generated heats space 45 and is transferred to oven roof 27 in the exposed areas between the strip members 50. While the applicant does not intend to be limited by any theory of operation, it is believed that the fibrous material in body portions 51 heats up and also serves to transfer heat through oven roof 27 by conduction. Irrespective of the theory offered, the unique structure of panel 40 has resulted in unexpected an remarkable temperatures in the oven compartment 25. For example, a cooker constructed substantially in accordance with the embodiment illustrated in FIGS. 1-4 was placed in the sun on a day in early November in North Carolina with the temperature at approximately 65° F and it took only 50 minutes to fully cook a steak from a cold start. On a 75° F day in October, the empty oven temperature was found to read 300° F after 45 minutes and 340° F after 1 hour and 15 minutes. The above results have proven the cooker to be useful for cooking on moderate days. On hotter summer days, cooking temperatures are significantly higher and cooking times shorter.

FIG. 5 illusrates a solar panel constructed according to the present invention. Panel 60 includes first and second windows 61, 62, strip members 70, and spacer members 75, 76, all of which are similar in construction to the analogous elements in cooker 10. The generated heat in panel 60 is transferred into a heat transfer chamber 80 which serves to transfer the heat to water transfer lines running through chamber 80. The construction of such water transfer lines are well known to those skilled in the art and will not be described in detail here. While not illustrated, panels similar to panel 60 may be used to heat other types of fluid materials.

In summary, the art is now provided with the first known solar cooker capable of rapidly reaching cooking temperatures on days with moderate temperatures in the range of 65°-75° F. The unique heat generating and collector area of the cooker utilizes a series of parallel spaced strips as the energy collectors, with the strips comprising a two-piece construction of fibrous material and metal foil in the preferred embodiment. Solar panels made according to the principles of the present invention have been found to have more universal application and may be used to heat water and other fluid materials.

What is claimed is:

1. A portable solar cooker comprising:
   a. a housing,
   b. a closed oven compartment formed within the lower portion of said housing, said oven compartment having a door opening on one side thereof and having a roof portion made from heat conductive material;
   c. a first outer transparent window closing a substantial part of the upper surface of said housing;
   d. a second inner transparent window spaced from said first window and, in conjunction with said first window, forming an insulating air space, said second window being spaced from said oven roof and providing a heat generating space therebetween; and
   e. heat generating and transfer means located in said heat generating space and comprising a series of spaced apart strip members, each strip member comprising a tubular body portion and a sheet material covering at least the upper surface of said body portion, said sheet material presenting a favorable heat absorbing color on the upper surface thereof.

2. A solar cooker as claimed in claim 1 including solar reflector means secured to the upper portion of said housing for directing solar energy through said windows and onto said strip members.

3. A solar cooker as claimed in claim 1 wherein said strip member tubular body portions are made from fibrous material.

4. A solar cooker as claimed in claim 1 wherein said strip member tubular body portions are made from fibrous insulation material of the type utilized in conventional housing insulation.

5. A solar cooker as claimed in claim 1 wherein said sheet material comprises metal foil having a flat black coating thereon.

6. A solar panel comprising a housing enclosing a chamber containing a medium to be heated, said chamber having a substantially flat roof surface of heat conductive material, and a heat generating and transfer unit positioned above said chamber roof and comprising: (i) a first outer transparent window; (ii) a second inner transparent window spaced from said first window and, in conjunction with said first window, forming an insulating air space, said second window being spaced from chamber roof and providing a heat generating space therebetween and (iii) a series of spaced apart strip members, each strip member comprising a tubular member presenting an upper surface having a favorable heat absorbing color.

7. A solar panel as claimed in claim 6 wherein said chamber includes at least one tubular path for enclosing selected fluids to be heated therein.

8. A solar panel as claimed in claim 6 wherein said tubular member comprises a a tubular body portion of fibrous material covered by thin foil sheet material.

* * * * *

UNITED STATES PATENT OFFICE
CERTIFICATE OF CORRECTION

Patent No. 4,077,391      Dated March 7, 1978

Inventor(s) Lee V. Way, Jr.

It is certified that error appears in the above-identified patent and that said Letters Patent are hereby corrected as shown below:

Col. 2, line 33, "Breifly" should be --Briefly--.

Col. 2, line 48, Insert --and-- after "27".

Col 3, line 11, Insert --upper-- after "the".

Col. 4, line 62, Delete the first occurrence of "a".

*Signed and Sealed this*

*Eleventh* Day of *July 1978*

[SEAL]

Attest:

RUTH C. MASON
*Attesting Officer*

DONALD W. BANNER
*Commissioner of Patents and Trademarks*